Nov. 30, 1971          G. H. MULLER          3,623,339
BELLOWS FLEXIBLE JOINT
Filed Nov. 28, 1969
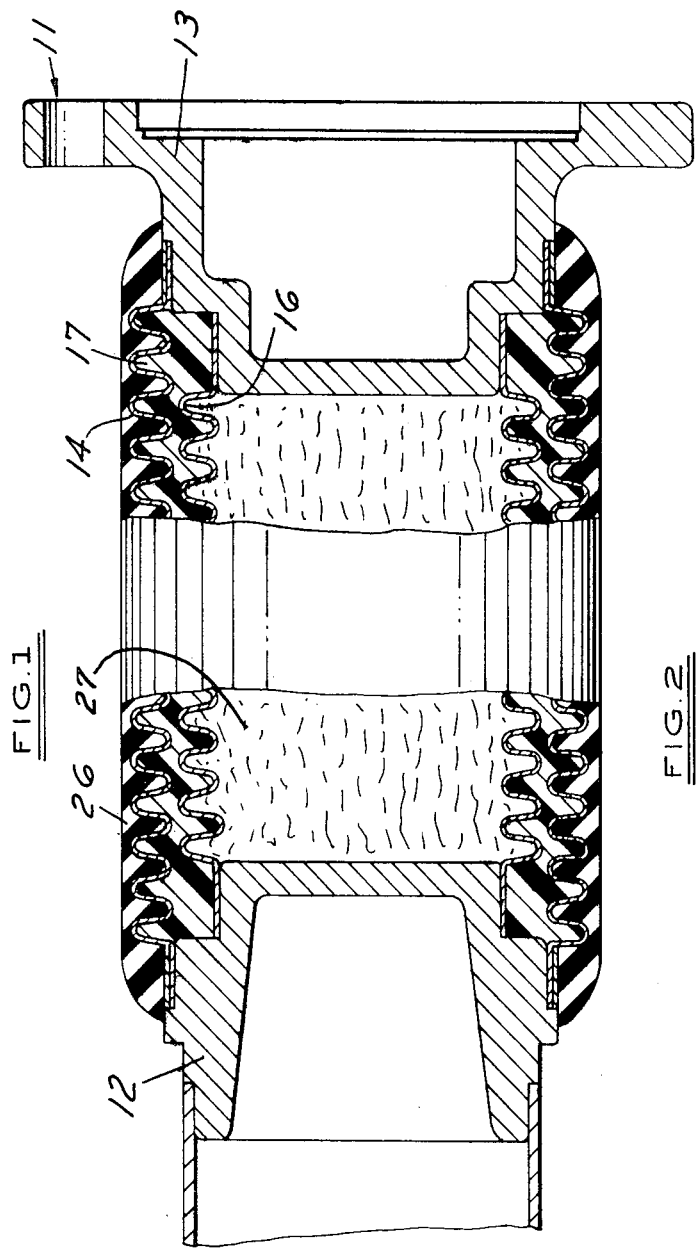
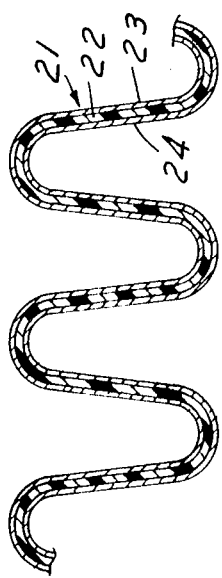
INVENTOR
*GEORGE H. MULLER*
BY
*John R Faulkner*
*Roger E Erickson*
ATTORNEYS United States Patent Office 3,623,339
Patented Nov. 30, 1971

3,623,339
BELLOWS FLEXIBLE JOINT
George H. Muller, Ann Arbor, Mich., assignor to
Ford Motor Company, Dearborn, Mich.
Filed Nov. 28, 1969, Ser. No. 880,525
Int. Cl. F16d 3/28
U.S. Cl. 64—11 B
8 Claims

ABSTRACT OF THE DISCLOSURE

A flexible joint for transferring torque including a multilayered metal cylindrical bellows in which the layers of metal are separated by an elastomeric material. The elastomeric material functions to equalize stresses in the metal bellows and to reduce torsional windup.

BACKGROUND AND SUMMARY OF THE INVENTION

A common universal joint used to transmit motion between two angularly misaligned rotating shafts is the simple Cardan joint. There are, however, many applications in which a Cardan joint is not well suited. One such application is where the nonuniform motion transmission characteristics of the Carden joint provide unacceptable velocity variations between the input and the output shaft. Another such application is where the weight or size of the joint is of primary importance. Many essentially constant velocity joints are presently available, but are often too cumbersome or too expensive for many applications where such constant velocity is desired.

It has been found that a cylindrical bellows positioned between two end members provides a substantially constant velocity flexible coupling for rotating shafts at relatively low torque loads and low speeds. See, for example, U.S. Pat. No. 3,232,076, granted Feb. 1, 1966 to Sundt. However, as the ratio of the transmitted torque to longitudinal bending stiffness of the bellows increases, such a bellows experiences increased torsional windup. This is because a bellows is characteristically stiff in torsion, but is relatively flexible in longitudinal bending. Torsional windup in a simple bellows thus undesirably limits its torque bearing capacity. It is not a solution to the problem of torsional windup to increase the over-all stiffness of the bellows so as to achieve sufficiently high longitudinal bending stiffness to prevent an undesirable degree of torsional windup. Such a joint would not be flexible enough in longitudinal bending and would be much too highly stressed to provide an operable flexible joint. Furthermore, with such a joint much of the torque input would be dissipated in flexing the joint rather than being transmitted by the joint.

This invention provides a bellows joint assembly having an increased resistance to torsional windup without a commensurate increase in bellows stiffness and stress. A concentrically multilayered bellows is provided in which the individual bellows layers are separated by elastomeric material. The elastomeric material has little effect on the bellows convolution portions in tension, but reduces significantly the "windup collapse" of the bellows convolution portions in compression. Furthermore, the elastomeric intermediate layer reduces and equalizes stress concentrations which would occur if a multilayered bellows assembly were used in which the individual metal bellows members were in direct metal-to-metal contact with each other.

In addition, the use of several relatively thin concentric bellows members in comparison with one sufficiently heavy bellows member reduces significantly the magnitude of surface stresses caused by the rotational flexing.

This invention also provides a universal joint assembly which is economical to produce and reliable in operation. It provides a flexible coupling which can be made axially compact in proportion to the smallness of the angle between the rotating shaft. Still further, this invention provides a universal joint which is completely enclosed and which has no rolling or sliding friction surfaces.

A flexible coupling constructed in accordance with this invention includes a pair of rotatable end members interconnected by at least two cylindrical bellows members which are radially separated by elastomeric material that functions to reduce torsional windup of the bellows members and to equalize stresses within the bellows members.

BRIEF DESCRIPTION OF THE DRAWINGS

FIG. 1 shows a cross sectional view of a bellows universal joint assembly embodying the invention; and FIG. 2 shows a cross sectional view of a portion of the wall of a bellows universal joint assembly showing an alternate embodiment of the invention in which the concentric bellows layers are radially proximate and in which the elastomeric layer is relatively thin.

DETAILED DESCRIPTION OF A PREFERRED EMBODIMENT

In the preferred embodiment a multilayered cylindrical bellows assembly 11 interconnects and is fastened to a pair of rotatable annular end members 12 and 13 as shown in FIG. 1 of the drawings. These rotatable end members are commonly referred to as the driving member and the driven member of a torque transfer assembly. The bellows assembly includes outer and inner bellows members 14 and 16 which are concentric and which may be constructed of stainless steel or nickel chromium steel of a thickness dependent upon the load to be carried and the flexibility desired. The bellows members are separated by a layer of the elastomeric material 17 such as neoprene which is bonded to the surface of the bellows members. While the preferred embodiment of the invention includes a pair of bellows members separated by a single layer of elastomeric material, the invention is also intended to include embodiments having more than two bellows members and in which each bellows member is separated from the next by a layer of elastomeric material.

The outer and inner bellows are preferably in phase in the axial direction, that is, the ridges and grooves of the bellows members are radially aligned as shown in the drawing.

An alternate embodiment is shown in FIG. 2 in which the multilayered bellows wall 21 in formed as a single unit and the elastomeric layer 22 is thin relative to the embodiment of FIG. 1. In this alternate embodiment, the outer and inner bellows layers 23 and 24 are cooperatively associated so that the outer ridges of the inner bellows are partially received within the radially inwardly opening grooves of the outer bellows. The bellows wall assembly 21 is thus similar to a laminate. The intermediate layers of elastomeric material 22 prevent contact between the bellows members and thus prevent stress concentrations within the bellows members which would otherwise occur where point or line contacts between the bellows members existed. Urethane bonded to the bellows members provide a suitable intermediate layer. Once again, the invention is intended to include embodiments having more than two bellows layers.

The number of convolutions is determined by the maximum angle between the ends 12 and 13 and by the stress characteristics of the bellows material. As the angle between the rotating shafts or ends 12 and 13 becomes larger, the number of convolutions must be increased to avoid over deflection of any individual convolution during a rotation of the joint assembly. Also, it should be noted that a bellows convolutin made of several relatively thin metal plies will be able to acceptably withstand a greater individual angular deflection than an equivalent single layer convolution.

An external layer of molded rubber 26 surrounds the outer bellows and provides protective covering as well as additional stability to the bellows assembly. Additional increased stability may be obtained by either completely or partially filling the inner portion of the inner bellows 16 with a fiberglass material or with additional elastomeric material 27. Also, a ball and socket device, well known in the art, may be used in combination with the embodiments heretofore described to provide a fixed point of intersection of the axes of rotation of the joint assembly.

Further alterations and modifications will occur to those skilled in the art which are included within the scope of the following claims.

I claim:
1. A flexible torque transfer assembly comprising:
   a rotatable driving member and a rotatable driven member,
   flexible means interconnecting said driving member and said driven member constructed to transmit torque and rotary motion between said members,
   said flexible means permitting angular displacement of the driven member relative to the driving member from an axially aligned position to various positions of axial misalignment,
   said flexible means including at least two cylindrical bellows interconnecting and secured to said driving member and said driven member,
   means to reduce torsionally induced stresses within said bellows comprising elastomeric material interposing and separating said bellows.
2. A flexible torque transfer assembly according to claim 1 wherein:
   said cylindrical bellows are concentric.
3. A flexible torque transfer assembly according to claim 1 wherein:
   said cylindrical bellows are relatively positioned so that the convolutions of each bellows are axially in phase.
4. A flexible torque transfer assembly according to claim 1 and including:
   said bellows having corrugated surfaces comprising alternate ridges and grooves,
   the radially outwardly projecting ridges of an inner bellows being received within the radially inwardly opening grooves of an outer bellows.
5. A flexible torque transfer assembly according to claim 4 wherein:
   said cylindrical bellows are concentric.
6. A flexible torque transfer assembly according to claim 5 and including:
   additional elastomeric material received within the radially outwardly opening grooves of an outer bellows.
7. A flexible torque transfer assembly according to claim 6 and including:
   said additional elastomeric material comprising a generally cylindrical member having a series of annular flanges extending into said radially outwardly opening grooves of an outer bellows member.
8. A flexible torque transfer according to claim 7 and including:
   elastomeric material received radially within the innermost bellows member and being received within the radially inwardly opening grooves of said innermost bellows member.

References Cited

UNITED STATES PATENTS

| | | | |
|---|---|---|---|
| 1,345,971 | 7/1920 | Star | 285—226 |
| 3,058,759 | 10/1962 | McDuff | 285—226 |
| 2,870,617 | 1/1959 | Peters | 64—15 |

BENJAMIN W. WYCHE, Primary Examiner

R. HEALD, Assistant Examiner

U.S. Cl. X.R.

285—226